(12) United States Patent
Hittel et al.

(10) Patent No.: US 10,715,205 B1
(45) Date of Patent: Jul. 14, 2020

(54) SIGNAL TO-NOISE HEADROOM DETERMINATION BY VARIABLE ATTENUATION

(71) Applicant: Fluke Corporation, Everett, WA (US)

(72) Inventors: John Paul Hittel, Phoenix, AZ (US); William F. Winston, Lake Stevens, WA (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 16/545,579

(22) Filed: Aug. 20, 2019

(51) Int. Cl.
*H04B 1/62* (2006.01)
*H04B 1/16* (2006.01)
*H04B 1/04* (2006.01)

(52) U.S. Cl.
CPC ............... *H04B 1/62* (2013.01); *H04B 1/04* (2013.01); *H04B 1/16* (2013.01); *H04B 2001/0416* (2013.01)

(58) Field of Classification Search
CPC ... H04B 1/62; H04B 1/04; H04B 1/16; H04B 2001/0416
See application file for complete search history.

(56) References Cited

U.S. PATENT DOCUMENTS

| | | | |
|---|---|---|---|
| 6,628,619 B1 * | 9/2003 | Giles | H04L 41/0816 370/248 |
| 2018/0184081 A1 * | 6/2018 | Harris | H04N 17/004 |
| 2018/0343070 A1 * | 11/2018 | Fujita | H04B 17/17 |

* cited by examiner

*Primary Examiner* — Dac V Ha
(74) *Attorney, Agent, or Firm* — Seed IP Law Group LLP (57) ABSTRACT

A method and a testing device for determining signal-to-noise headroom of a pair of conductors are provided. In the method and testing device, a gain of electric signal transmissions over a pair of conductors is varied to reach a first gain. Prior to reaching the first gain a transition between reception failure and successful reception of the electric signal transmissions does not occur. A first electric signal having the first gain is transmitted over a first end of the pair of conductors and it is determined that the transition between reception failure and successful reception of the first electric signal occurred. A signal-to-noise ratio (SNR) headroom for the pair of conductors is determined based on the first gain at which the transition between reception failure and successful reception occurred.

20 Claims, 6 Drawing Sheets

SIGNAL TO-NOISE HEADROOM DETERMINATION BY VARIABLE ATTENUATION

BACKGROUND

Technical Field

This application is directed to determining signal-to-noise headroom of a cable or conductor pair.

Description of the Related Art

Installers and maintainers of Ethernet devices often wish to perform tests that determine whether devices are able to communicate through a channel of metallic cabling, such as copper or copper clad aluminum cabling, among others. The devices, which are connected by cabling, may be tested by sending packets and determining whether the packets are correctly received or determining a bit error rate (BER) for the packets. While a BER test is useful, the test is time-consuming and the results of the test are specific to the two devices and cabling under the test conditions. The results of a BER test, among other tests, may not be reliably extended, to other devices and environments, beyond the specific devices under test and the test environment.

A pair of Ethernet devices are able to communicate if the signal-to-noise ratio (SNR) at each receiver is sufficient for the receiver to decode the signals transmitted by the other device that is party to the communication. Noise, including crosstalk, return reflections, external electromagnetic interference and internal noise, among others, contributes to the SNR. If signal power exceeds the noise power by some amount, a receiver can properly decode the signal. An internal amplifier may be used to increase the power of the received signal. However, the amplifier also amplifies the noise, such that generally the SNR is indicative of communication fidelity.

The SNR needed for reliable communication is dependent on transmitter, receiver or transceiver design. Old or poorly made devices generally require a higher SNR to achieve reliable communication than new or well-made devices. There is, therefore, a need to more efficiently and accurately measure SNR headroom in a variety of cabling installations to ensure reliable communication, even where varying equipment and cabling may be deployed.

BRIEF SUMMARY

In an embodiment, a testing device includes an attenuator, coupled to a first end of a pair of conductors, configured to receive data indicative of a first gain and adjust a transmission power of a first electric signal, over the pair of conductors, in accordance with the first gain. The testing device includes a processor configured to vary a gain of electric signal transmissions over the pair of conductors to reach a first gain. Prior to reaching the first gain a transition between reception failure and successful reception of the electric signal transmissions does not occur. The processor is configured to output the data indicative of the first gain for transmission of the first electric signal, determine that the transition between reception failure and successful reception of the first electric signal occurred and determine a signal-to-noise ratio (SNR) headroom for the pair of conductors based on the first gain at which the transition between reception failure and successful reception occurred.

In an embodiment, the processor is configured to vary the gain of electric signal transmissions by at least decreasing the gain, from a second gain at which reception failure of the first electric signal did not occur, to the first gain. In an embodiment, the second gain initially is a unitary gain. In an embodiment, the processor is configured to vary the gain of electric signal transmissions by at least: increasing the gain, from a second gain at which successful reception of the first electric signal did not occur, to the first gain. In an embodiment, the testing device includes a receiver configured to receive, from a second device coupled to a second end of the pair of conductors, data indicative of the reception failure of the first electric signal including at least one of: a non-acknowledgement of reception of the first electric signal, or an indication to reinitiate communication with the second device.

In an embodiment, the processor is configured to determine that the transition between reception failure and successful reception of the first electric signal occurred based on a failure to receive communication from a second device coupled to a second end of the pair of conductors. In an embodiment, the processor is configured to determine the SNR headroom as: a difference between a power of the first electric signal without attenuation and the transmission power of the first electric signal at which the transition between reception failure and successful reception occurred, or a difference between a gain of one and the first gain at which the transition between reception failure and successful reception occurred.

In an embodiment, the testing device includes an output device, communicatively coupled to the processor, configured to receive the SNR headroom from the processor and output the SNR headroom.

In an embodiment, a method includes varying a gain of electric signal transmissions over a pair of conductors to reach a first gain. Prior to reaching the first gain a transition between reception failure and successful reception of the electric signal transmissions does not occur. In an embodiment, the method includes transmitting a first electric signal having the first gain over a first end of the pair of conductors, determining that the transition between reception failure and successful reception of the first electric signal occurred and determining a signal-to-noise ratio (SNR) headroom for the pair of conductors based on the first gain at which the transition between reception failure and successful reception occurred.

In an embodiment, varying the gain of electric signal transmissions includes decreasing the gain, from a second gain at which the transition between reception failure and successful reception of the first electric signal did not occur, to the first gain. In an embodiment, varying the gain of electric signal transmissions includes increasing the gain, from a second gain at which the transition between reception failure and successful reception of the first electric signal did not occur, to the first gain.

In an embodiment, determining that the transition between reception failure and successful reception of the first electric signal occurred includes receiving data indicative of a reception failure of the first electric signal from a second device coupled to a second end of the pair of conductors and determining, based on the data, that the transition between reception failure and successful reception of the first electric signal occurred, wherein the data indicative of the reception failure includes at least one of: a non-acknowledgement of reception of the first electric signal, or an indication to reinitiate communication with the second device.

In an embodiment, determining that the reception failure of the first electric signal occurred includes determining a failure to receive communication from a second device coupled to a second end of the pair of conductors. In an embodiment, the method includes determining the SNR headroom as a difference between a power of the first electric signal without attenuation and a transmission power of the first electric signal at which the transition between reception failure and successful reception occurred or a difference between a gain of one and the first gain at which the transition between reception failure and successful reception occurred.

In an embodiment, a system includes a first testing device terminal. The first testing device terminal includes a first attenuator, coupled to a first end of a first pair of conductors and configured to receive data indicative of a first gain and adjust a transmission power of a first electric signal, over the first pair of conductors, in accordance with the first gain. The first testing device terminal includes a first processor configured to vary a gain of electric signal transmissions over the first pair of conductors to reach the first gain. Prior to reaching the first gain a transition between reception failure and successful reception of the electric signal transmissions does not occur. The first processor is configured to output, to the first attenuator, the data indicative of the first gain for transmission of the first electric signal, receive data indicating that the transition between reception failure and successful reception occurred and determine a first signal-to-noise ratio (SNR) headroom for the first pair of conductors based on the first gain at which the transition between reception failure and successful reception of the first electric signal occurred.

In an embodiment, the system includes a second testing device terminal including a second attenuator, coupled to a second end of a second pair of conductors, configured to receive data indicative of a second gain and adjust a transmission power of a second electric signal, over the second pair of conductors, in accordance with the second gain. The second testing device includes a second processor configured to vary a gain of electric signal transmissions over the second pair of conductors to reach the second gain. Prior to reaching the second gain a transition between reception failure and successful reception of the electric signal transmissions does not occur. The second processor is configured to output, to the second attenuator, data indicative of the second gain for transmission of the second electric signal, receive data indicating that the transition between reception failure and successful reception of the second electric signal occurred and determine a second SNR headroom for the second pair of conductors based on the second gain at which the transition between reception failure and successful reception of the second electric signal occurred.

In an embodiment, the first SNR is determined for the second end of the first pair of conductors and the second SNR headroom is determined for the first end of the second pair of conductors. In an embodiment, the first processor is configured to vary the gain of electric signal transmissions by at least: decreasing the gain, from a third gain at which the transition between reception failure and successful reception of the first electric signal did not occur, to the first gain.

In an embodiment, the second testing device terminal is coupled to a second end of the first pair of conductors and the first testing device terminal is coupled to a first end of the second pair of conductors. In an embodiment, the first testing device terminal includes a first receiver configured to receive, from the second testing device terminal, the data indicating that the transition between reception failure and successful reception of the first electric signal occurred and the second testing device terminal includes a second receiver configured to receive, from the first testing device terminal, the data indicating that the transition between reception failure and successful reception of the second electric signal occurred.

In an embodiment, the data indicating that the transition between reception failure and successful reception of the first electric signal occurred includes: a non-acknowledgement of reception of the first electric signal, or an indication to reinitiate communication with the second testing device terminal, and the data indicative indicating that the transition between reception failure and successful reception of the second electric signal occurred includes: a non-acknowledgement of reception of the second electric signal, or an indication to reinitiate communication with the first testing device terminal.

DETAILED DESCRIPTION

Figure 1:
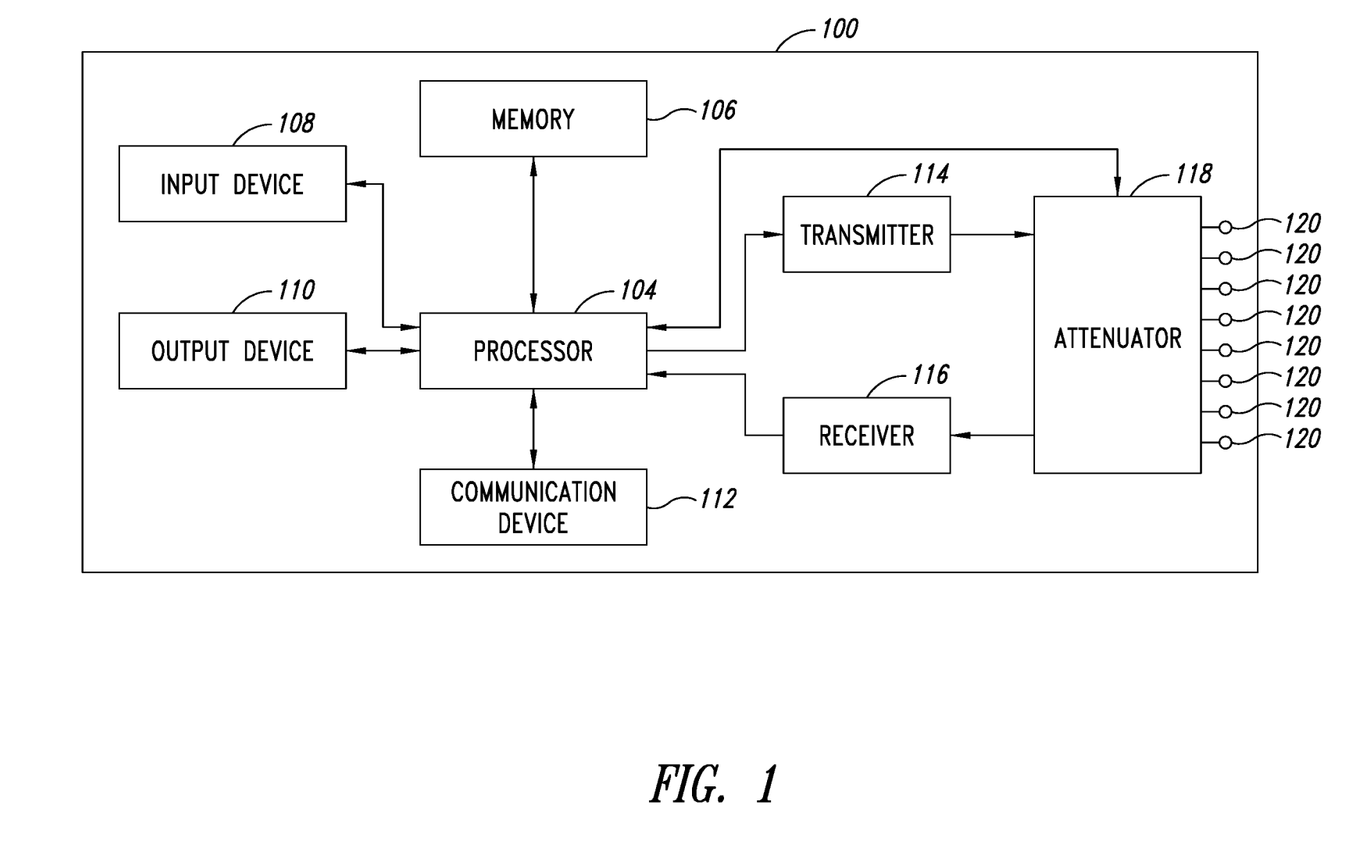
FIG. 1 shows a block diagram of a testing device.

FIG. 1 shows a block diagram of a testing device 100. The testing device 100 includes a processor 104, memory 106, an input device 108, an output device 110, a communication device 112, a transmitter 114, a receiver 116 and an attenuator 118. The testing device 100 has a plurality of terminals 120. The processor 104 is communicatively coupled to the memory 106, input device 108, output device 110, communication device, transmitter 114, receiver 116 and attenuator 118.

The attenuator 118 may be any type of device that is configured to adjust an output power (or transmission) of an electric signal. For example, the attenuator 118 may be a variable gain attenuator with a gain that is greater than zero and less than one (unitary gain). The attenuator 118 may be an amplifier, among others. The attenuator 118 may increase or decrease the power of the electric signal without affecting otherwise affecting a waveform or a content of the electric signal. The attenuator 118 has an input coupled to an output of the transmitter 114. The attenuator 118 receives the electric signal from the transmitter 114. The attenuator 118 attenuates the electric signal and outputs the attenuated electric signal over one or more of the plurality of terminals 120. The plurality of terminals 120 are configured to be communicatively coupled to a respective plurality of conductors of a cable or a cabling installation (not shown). The attenuator 118 also has an input coupled to an output of the processor 104. The attenuator 118 receives, from the processor 104, a signal or data indicative of the gain to be applied to (or used in transmitting) the electric signal.

The attenuator 118 has an output coupled to an input of the receiver 116. The attenuator receives electric signals over one or more of the plurality of terminals 120 and outputs the received signals to the receiver 116. The signals may be outputted without attenuation. Alternatively, in some embodiments the signals may be outputted with attenuation.

The transmitter 114 may be any type of device configured to generate and output the electric signal. The transmitter 114 has an input coupled to the processor 104 and an output coupled to the attenuator 118. The transmitter 114 may receive, from the processor 104, data for transmission. The transmitter 114 may perform analog-to-digital (ADC) conversion on the data, modulate or code the data or perform baseband processing on the data to generate the electric signal. The transmitter 114 then outputs the electric signal to the attenuator 118.

The receiver 116 has an input coupled to an output of the attenuator. The receiver 116 may any device configured to receive and operate on an electric signal. The receiver 116 may perform demodulation, decoding, baseband processing or digital-to-analog conversion (DAC) on the electric signal. The receiver 116 may output data representative of the electric signal to the processor 104.

The processor 104 may be any type of device configured to execute executable instructions stored in the memory 106. When the executable instructions are executed by the processor 104, the executable instructions cause the processor 104 to perform the functions or techniques described herein. The processor 104 may be a controller, a microcontroller or a microprocessor, among others, and may include an arithmetic and logic unit (ALU), among other computational units. The processor 104 sends data representative of the electric signal to the transmitter 114 and commands the transmitter 114 to transmit the electric signal. The processor 104 sets the gain of the attenuator 118 and sends data indicative of the gain to the attenuator 118. The processor 104 also receives, from the receiver 116, data representative of the received electric signal. The processor 104 evaluates the data. As described herein, the processor 104 may determine whether a reception failure occurred (or communication link between the transmitter 114 and a receiver has failed). The processor 104 may determine whether the reception failure occurred based on the data.

As described herein, the processor 104 may determine a signal-to-noise ratio (SNR) headroom for a pair of conductors. The processor 104 outputs an indication of the SNR headroom to the output device 110.

The memory 106 may be any device that is configured to store executable instructions that, when executed by the processor 104, cause the processor 104 to perform the operations or techniques described herein. The executable instructions may be a computer program or code. The memory 106 may also store data pertaining to the performed SNR headroom testing, such as a test result. The memory 106 may include a random access memory (RAM) and/or a read-only memory (ROM).

The output device 110 may be any type of device configured to output data to a user. For example, the output device 110 may be a display or a speaker, among others. The output device 110 may output, to a user, the results of the SNR headroom testing received from the processor 104.

The communication device 112 may be any device that is configured to communicate with another device and transmit data to or receive data from the other device. The communication device 112 may communicate using a wireless or wired communications protocol. For example, the communication device 112 may be a modem or a transceiver.

The input device 108 may be any type of device configured to receive user input. The input device 108 may be configured to output data indicative of the user input to the processor 104. The input device 108 may be a touchscreen or keypad, among others. The input device 108 may receive, from the user, an input indicative of a test (for example, an SNR headroom test) to be performed on conductors. As described herein performing a test on the conductors may include performing a test on a cable or cabling installation. Further, the input device 108 may receive an identity of the conductors to be tested. The input device 108 outputs to the processor data indicative of the user input.

In an embodiment, the testing device 100 may have a transceiver in place of the transmitter 114 and receiver 116. Further, the attenuator 118 may be coupled to an output of the transceiver, an input of the transceiver or both the input and the output of the transceiver. The attenuator 118 may also be part of the transmitter 114 or transceiver. For example, the attenuator 118 may be an amplifier in the transmitter 114 or transceiver.

Figure 2:
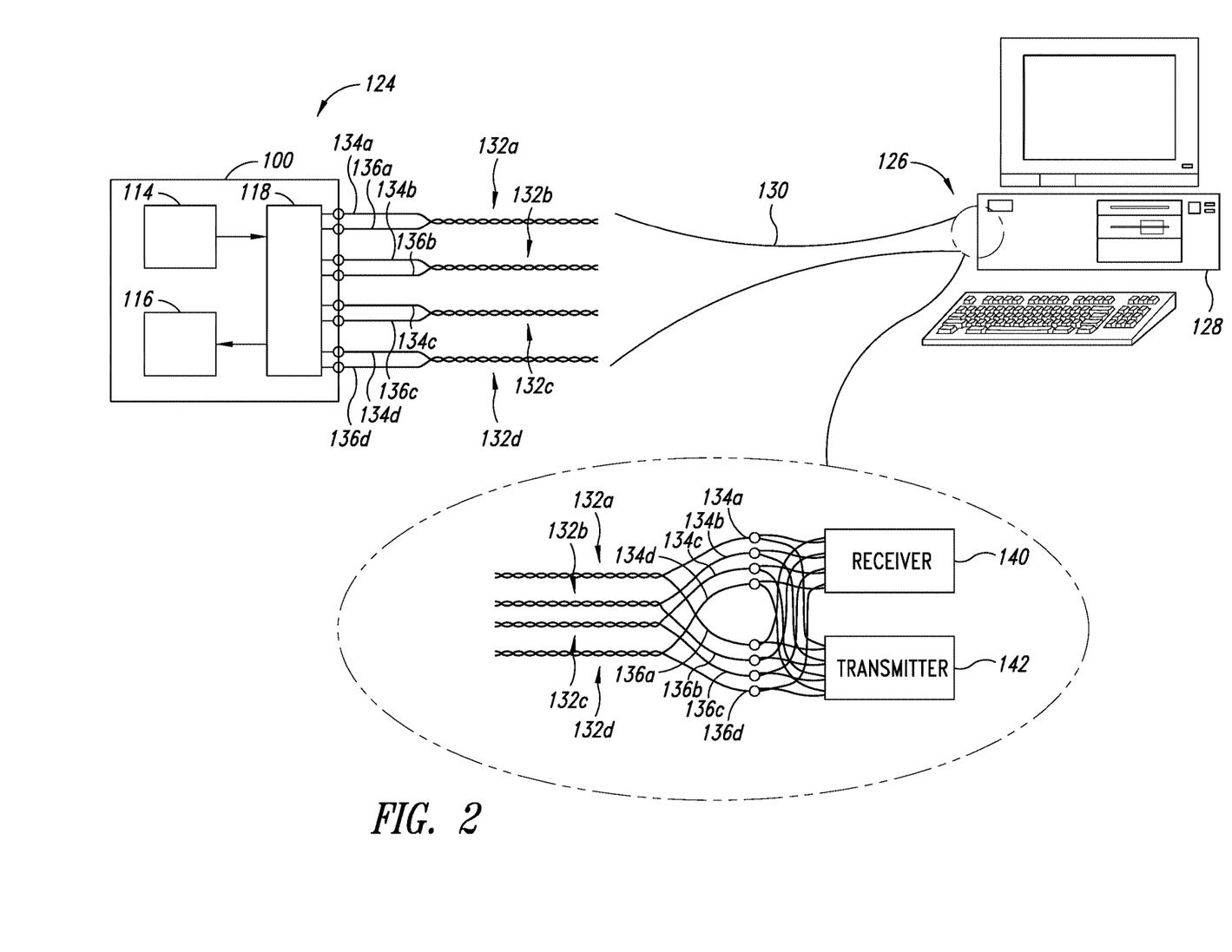
FIG. 2 shows the testing device coupled to a first end of a cable.

FIG. 2 shows the testing device 100 coupled to a first end 124 of a cable 130. A second end 126 of the cable 130 is shown to be coupled to a computer system 128. The cable 130 includes a plurality of twisted pairs 132*a-d*. The plurality of twisted pairs 132*a-d* respectively include a plurality of first conductors 134*a-d* and a plurality of second conductors 136*a-d*. The plurality of first conductors 134*a-d* and the plurality of second conductors 136*a-d* carry electric signals transmitted from the testing device 100 to the computer system 128 and from the computer system 128 to the testing device 100. In particular, the computer system 128 includes a receiver 140 and a transmitter 142, among other components. The receiver 140 of the computer system 128 is coupled to the plurality of first conductors 134*a-d* and the plurality of second conductors 136*a-d* at the second end 126 of the cable 130. The receiver 140 of the computer system 128 may be similar to the receiver 116 of the testing device 100. The transmitter 142 of the computer system 128 is coupled to the plurality of first conductors 134*a-d* and the plurality of second conductors 136*a-d* at the second end 126 of the cable 130. The transmitter 142 of the computer system 128 may be similar to the transmitter 118 of the testing device 100. It is noted that the computer system 128 may generally be any device configured to exchange signal transmission with the testing device 100 in accordance with a communication protocol. The computer system 128 may a second terminal of the testing device 100 as described herein.

The cable 130 may be used for communication compliant with the Institute of Electrical and Electronics Engineers (IEEE) 802.3 protocol (or Ethernet protocol), among other communication protocols. Per some communication protocols, including the Ethernet protocol, communication is negotiated by two devices that are parties to the communication. A link quality over a conductor 134, 136 is evaluated during the course of communication. The testing device 100 and the computer system 128 evaluate electric signals that carry data to determine whether the reception over a conductor 134, 136 has failed. Reception failure may be declared when a criterion for communication between the devices is not met. For example, reception failure may be declared when error-correction or error-detection measures employed by the communication protocol to correct for noise-induced errors do not sufficiently correct such noise-induced errors.

As described herein, reception failure may occur when communication between the testing device 100 and the computer system 128 fails. Although the term reception failure is used herein, it is noted that reception failure may include a variety of events, such as link failure or communication failure.

The likelihood of reception failure is negatively correlated with SNR or a difference between signal power and noise power. As the SNR increases, the likelihood of reception failure decreases and vice-versa. SNR headroom for a conductor 134, 136 or pair of conductors 134, 136 (or generally the cable 130 or a cabling installation including the cable 130) is determined by changing the gain of an electric signal transmitted by the testing device 100 until reaching a transition between reception failure (or communication failure) and successful reception (non-reception failure).

For example, the SNR headroom may be determined by increasing the attenuation (or decreasing the gain) of the electric signal transmitted by the testing device 100 until reaching a transition from successful reception to a reception failure. Increasing the attenuation of the electric signal refers herein to reducing the gain of the attenuator or reducing the power of the electric signal. Conversely, the SNR headroom may be determined by decreasing the attenuation (or increasing the gain) of the electric signal transmitted by the testing device 100 until a transition from reception failure to successful reception is reached.

The cable 130 may be any type of cable, such as a coaxial cable having metallic conductors, such as copper or copper clad aluminum conductors, among others. Further, the cable 130 may have any number of twisted pairs of conductors, such as four twisted pairs.

Figure 3:
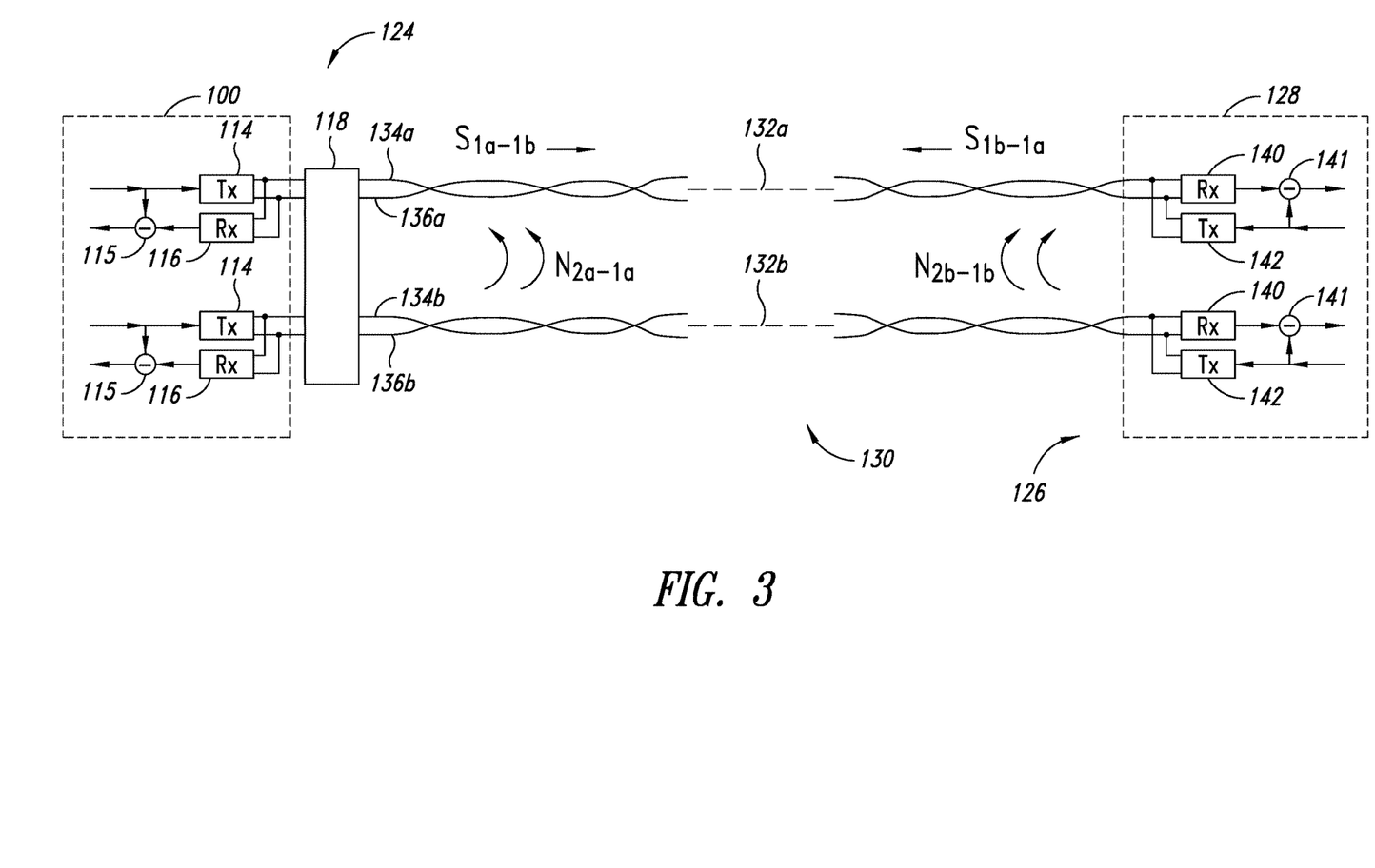
FIG. 3 shows the testing device coupled to the first end of the cable having the second end coupled to a computer system.

FIG. 3 shows the testing device 100 coupled to the first end 124 of the cable 130 having the second end 126 coupled to the computer system 128. In the example of FIG. 3, the testing device 100 transmits a first electric signal ($S_{1a-1b}$) over a first twisted pair 132a to the computer system 128. The first electric signal ($S_{1a-1b}$) is transmitted by the transmitter 114 and may be attenuated by the attenuator 118. The receiver 140 of the computer system 128 receives the first electric signal ($S_{1a-1b}$). The computer system 128 transmits a second electric signal ($S_{1b-1a}$) over the first twisted pair 132a to the testing device 100. The second electric signal ($S_{1b-1a}$) is transmitted by the transmitter 142 of the computer system 128. FIG. 3 shows the testing device 100 including a subtractor 115 for subtracting the transmitted signal from the received signal. Similarly, the computer system 128 includes a subtractor 141 for subtracting the transmitted signal from the received signal.

Concurrently, the testing device 100 and the computer system 128 may also transmit and receive electric signals using other twisted pairs 132b-d of the plurality of twisted pairs 132a-d. The second twisted pair 132b is shown in FIG. 3, however, it is noted that signal transmission and reception may take place over multiple other twisted pairs.

Signal transmission over the other twisted pairs 132b-d of the plurality of twisted pairs 132a-d introduces crosstalk noise in the first electric signal ($S_{1a-1b}$) and the second electric signal ($S_{1b-1a}$) transmitted over the first twisted pair 132a. Near end crosstalk (NEXT) is a significant contributor to noise in the first conductor 134a and the second conductor 136a. Other sources of noise include electromagnetic interference from the environment of the cable 130 as well as noise introduced by the transmitters 114, 140 and the receivers 116, 142.

Near end crosstalk is typically introduced at a receiving end due to adjacent signal transmission at the receiving end.

In FIG. 3, at the second end 126, signal transmission by the computer system 128 over the second twisted pair 132b introduces near end crosstalk in the first electric signal ($S_{1a-1b}$) received by the computer system 128 over the first twisted pair 132a. The near end crosstalk, among other sources of noise, is represented as $N_{2b-1b}$. At the first end 124, signal transmission by the testing device 100 over the second twisted pair 132b introduces near end crosstalk in the second electric signal ($S_{1b-1a}$) received by the testing device 100 over the first twisted pair 132a. In this case, the near end crosstalk, among other sources of noise, is represented as $N_{2a-1a}$.

Near end crosstalk may be different at the first and second ends 124, 126 due to differences between the transmitter 114 of the testing device 100 and the transmitter 142 of the computer system 128 and due to cable 130 properties, such as makeup or construction. As a result, the testing device 100 and the computer system 128 may experience different signal-to-noise ratios (SNRs).

It is noted that although two twisted pairs 132a, 132b are described herein, a cable may have any other number of twisted pairs. A matrix representing noise introduced by each twisted pair in the remaining twisted pairs of the cable may be developed based on the techniques described herein.

The ratio of the power of the first electric signal ($S_{1a-1b}$) received by the computer system 128 over the first twisted pair 132a to interfering noise ($N_{2b-1b}$) may be represented as $S_{1a-1b}/N_{2b-1b}$. When the first electric signal ($S_{1a-1b}$) is attenuated by a gain (X), which is between 0 and 1 ($0<X<1$), the power of the first electric signal ($S_{1a-1b}$) becomes ($XS_{1a-1b}$). Consequently, the SNR becomes $XS_{1a-1b}/N_{2b-1b}$.

Attenuating the first electric signal ($S_{1a-1b}$) at transmission reduces the power of the first electric signal ($S_{1a-1b}$) received at the computer system 128 at the second end 126. Because the computer system 128 does not attenuate transmissions, the noise level due to crosstalk introduced in the first electric signal remains unchanged.

SNR headroom is a difference between the SNR of a non-attenuated transmission at one end of the cable 130 and the SNR at which an attenuated transmission fails or reception failure is declared. To determine the SNR headroom, the testing device 100 may transmit the first electric signal ($S_{1a-1b}$) at changing attenuation levels (or decreasing gains) and evaluate whether a transition occurred from successful reception of the first electric signal ($S_{1a-1b}$) to a failed reception of the first electric signal ($S_{1a-1b}$) at the computer system 128.

To determine the SNR headroom, the testing device 100 may transmit the first electric signal ($S_{1a-1b}$) at increasing attenuation levels (or decreasing gains) and evaluate whether the reception of the first electric signal ($S_{1a-1b}$) at the computer system 128 fails. Alternatively, the testing device 100 may transmit the first electric signal ($S_{1a-1b}$) at decreasing attenuation levels (or increasing gains) and evaluate whether the first electric signal ($S_{1a-1b}$) is received by the computer system 128. The attenuation at which the transition occurs between successful reception and failed reception of the first electric signal ($S_{1a-1b}$) fails may represent the SNR headroom. For example, if during testing the gain is decreased and reception continues to be successful until reception failure occurs at gain of X=0.6 or attenuation of 0.4, then the SNR headroom may be deemed to be 0.4 or 0.4 of the SNR. Conversely, if reception failure does not occur until the gain is 0.2 or the attenuation is 0.8, then the SNR headroom is 0.8 or 0.8 of the SNR.

In another example, the testing device 100 may initially set the gain to zero and incrementally increase the gain in steps of 0.05. Initially, the computer system 128 fails to receive the first electric signal ($S_{1a\text{-}1b}$) due to the small gain. If at a gain of X=0.45 the computer system 128 fails to receive the first electric signal ($S_{1a\text{-}1b}$) but at the next increment of X=0.5 the computer system 128 successfully receives the first electric signal ($S_{1a\text{-}1b}$), the transition between reception success and failure may be said to occur at a gain of 0.45 or 0.5. Alternatively, the transition between reception success and failure may be said to occur at the average of 0.45 and 0.5 (i.e., 0.475) or any other function of the gains. In an embodiment, when the gains surrounding the transition point are identified, iterative processing may be performed to arrive at a finer gain. For example, the granularity of the steps may be reduced to 0.01 or 0.005 and the gain may be incrementally increased until successful reception is identified.

An SNR headroom or margin may be determined as a difference between the power of the first electric signal ($S_{1a\text{-}1b}$) without attenuation and the power of the attenuated first electric signal ($S_{1a\text{-}1b}$) at which transition occurs between successful reception and failed reception. The difference in power is a permissible headroom or margin (measured in signal or noise power) before reception failure occurs.

A higher SNR headroom is indicative of greater reliability of the cable 130. A cable having a relatively large SNR headroom may be used with a greater degree of reliability in noisy environments, with aging devices or circuitry or with inferior or poorly constructed transmitters, receivers or transceivers. That is due to the fact that the headroom is tantamount to a buffer or a margin. A relatively large headroom implies that noise may increase (to levels just short of the headroom) before reception failure occurs. It is noted that although the term SNR headroom is used herein, the SNR headroom is representative of any signal or noise power margin or power difference and is not limited to a ratio of signal to noise power.

The testing device 100 may identify the transition between successful reception and failed reception based on communication with the computer system 128 or features of the communication protocol used to communicate between the testing device 100 and the computer system 128. The testing device 100 may identify a reception failure based on the absence of communication with the computer system 128 or failure to communicate with the computer system 128. For example, if an idle mode transmission ceases, reception failure may be declared. The testing device 100 may identify a successful reception based on the presence of communication with the computer system 128 or the ability to communicate with the computer system 128. For example, if an idle mode transmission ceases, reception failure may be declared.

Various communication protocols specify reporting signal reception failures by devices that are parties to a communication or include a handshake protocol that is triggered when a reception failure occurs to restart communication upon a failure, among other techniques. For example, receipt of a non-acknowledgement (NACK) from the computer system 128 or an initiation of a handshake may be indicative of a reception failure. The testing device 100 may be configured with a criterion for detecting reception failure. The criterion may be met when a non-acknowledgement is received or when a handshake is initiated by the computer system 128. The testing device 100 may be configured with a criterion for detecting successful reception. The criterion may be met receipt of an acknowledgement. Reception failure may be identified based on a change in a power consumption of the transmitter 114, a software indication of transmission failure, an increase in a requisite time to transmit a block of data or user input indicating the reception failure (or the successful reception). For example, the user may use the input device 108 to indicate transmission or reception failure in the event that the user notices the failure.

It is noted that the testing device 100 determines SNR headroom at the second end 126 of the cable 130 (i.e., for signals received by the computer system 128). To determine SNR headroom at the first end 124 of the cable 130 (i.e., for signals received by the testing device 100), a dual-terminal testing device may be used. In the dual-terminal testing device, the testing device 100 described with reference to FIG. 1 may serve as a first terminal (or near end terminal). A second terminal that is similarly configured as the testing device 100 described with reference to FIG. 1 is coupled to the second end 126 of the cable 130 and used to test the SNR headroom at the first end 124 of the cable 130.

Figure 4:
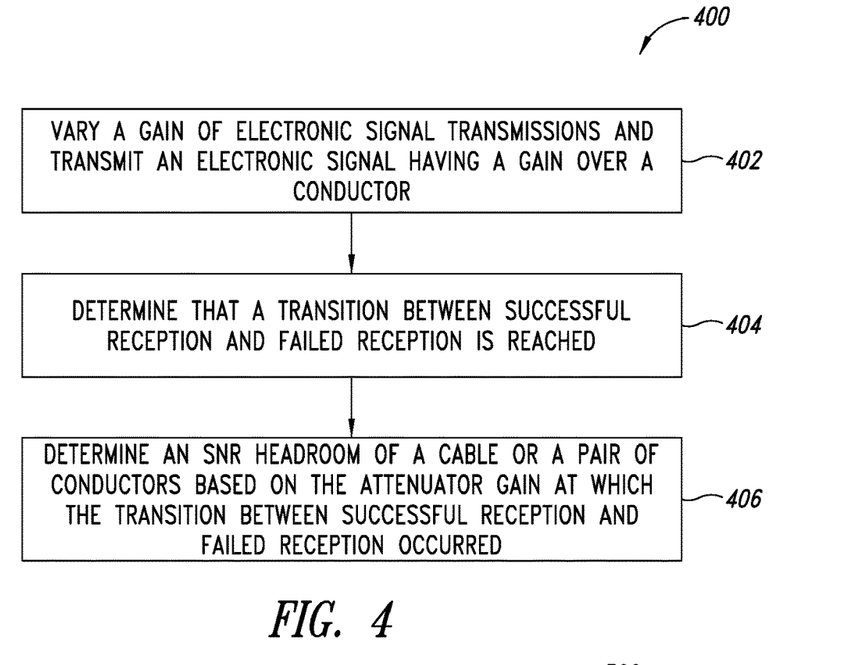
FIG. 4 shows a flow diagram of a method for determining SNR headroom of a cable.

FIG. 4 shows a flow diagram of a method for determining SNR headroom of a cable. In the method 400, at 402, an attenuator, such as the attenuator 118 described with reference to FIG. 1, varies a gain of electric signal transmissions and causes an electric signal to be transmitted having a gain. The attenuator varies a gain of electric signal transmissions to reach a gain at which transmission failure occurs. The attenuator may be commanded by the processor 104 to increase or decrease the gain of signal transmission until a transition between successful reception and failed reception occurs. For example, the attenuator may initially transmit signals having a unitary gain of one without attenuation. The processor 104 may command the attenuator to decrease the gain as long as signal transmissions are reliably received by the computer system 128. A signal transmission may be said to be reliably received if the computer system 128 can demodulate or decode the signal transmission to obtain data carried by the signal transmission. A signal transmission may be said to be reliably received if the signal transmission has an SNR that is sufficient for the signal transmission to be accurately decoded or demodulated or that is within limits set by a communication protocol. The gain may be incrementally decreased in steps, such as steps of 0.01 or 0.05. Alternatively, the processor 104 may command the attenuator to increase the gain, for example, from a gain of zero, and keep increasing the gain until signal transmissions are reliably received by the computer system 128.

At 404, a processor, such as the processor 104 described with reference to FIG. 1, determines that a transition between successful reception and failed reception is reached. The processor 104 may determine that the reception failure occurred based on idle mode transmissions or due to the fact that the idle mode transmissions ceased. The processor 104 may determine that the reception failure occurred based on a communication received from the computer system 128. For example, a non-acknowledgement (NACK) of reception of the first electric signal or an indication to reinitiate communication with the computer system 128 may be indicative of a reception failure.

At 406, the processor determines an SNR headroom of a cable or a pair of conductors based on the attenuator gain at which the transition between successful reception and failed reception occurred. If the gain is decreased then at a point, the gain will be sufficiently low (or the attenuation sufficiently high) to cause a transition from successful reception to a reception failure. The processor may determine the SNR headroom as difference between a power of the electric signal without the effect of attenuation and a power of the electric signal after attenuation. Further, the processor may determine the SNR headroom as a complement of the gain (or a difference between one and the gain used to transmit the electric signal).

Figure 5:
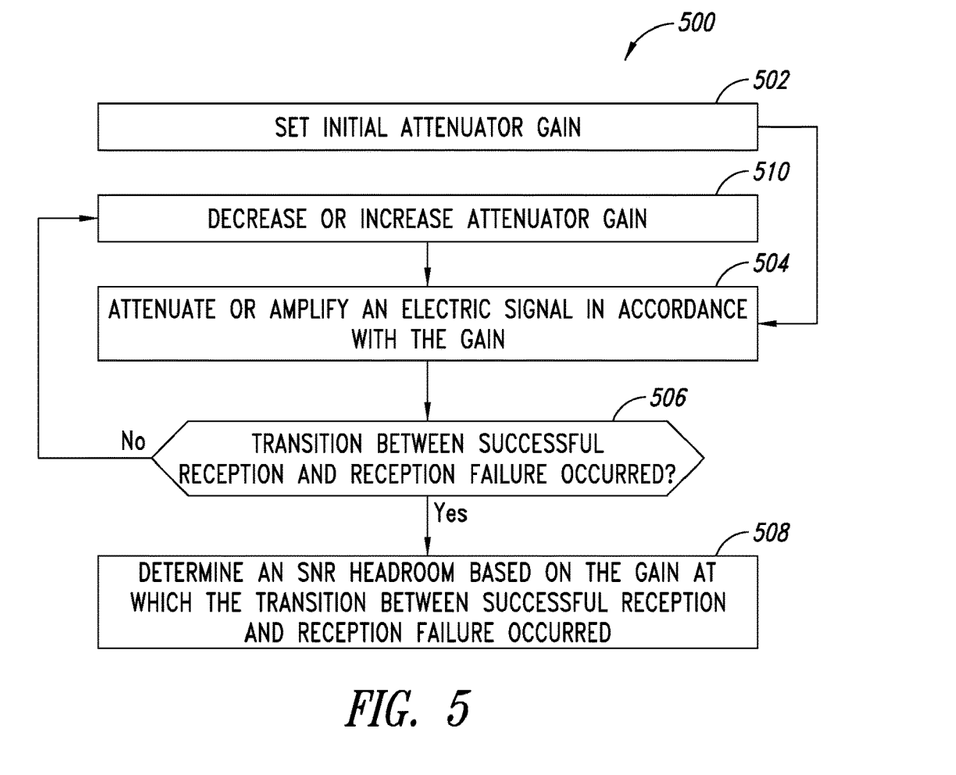
FIG. 5 shows a flow diagram of a method for determining SNR headroom of a cable.

FIG. 5 shows a flow diagram of a method for determining SNR headroom of a cable. In the method 500, a processor, such as the processor 104 described with reference to FIG. 1, sets an initial attenuator gain at 502. The initial gain may be set to be unitary gain or zero gain. The processor may send the gain to an attenuator, such as the attenuator 118 described with reference to FIG. 1.

The attenuator attenuates or amplifies an electric signal in accordance with the gain and causes the electric signal to be transmitted at 504. The processor then determines, at 506, whether a transition between successful reception and reception failure occurred. If a positive determination is made, the processor, at 508, determines an SNR headroom of a pair of conductors or a cable used to transmit the electric signal based on the gain at which the transition between successful reception and reception failure occurred.

Conversely, if a negative determination is made, the processor continues the process of decreasing or increasing the attenuator gain at 510. Decreasing or increasing the gain may be performed incrementally. The gain is decreased or increased to reach an SNR level at which the transition between successful reception and reception failure occurs. The processor sends data representative of the gain to the attenuator. After decreasing or increasing the gain, the steps 504 and 506 are performed again, whereby the attenuator attenuates an electric signal in accordance with the gain and causes the electric signal to be transmitted. Further, the processor determines whether the transition between successful reception and reception failure is reached, whereby if a positive determination is made, the processor, at 508, determines the SNR headroom based on the reduced or increased gain and if a negative determination is made, the processor reduces or increases the gain once again.

Figure 6:
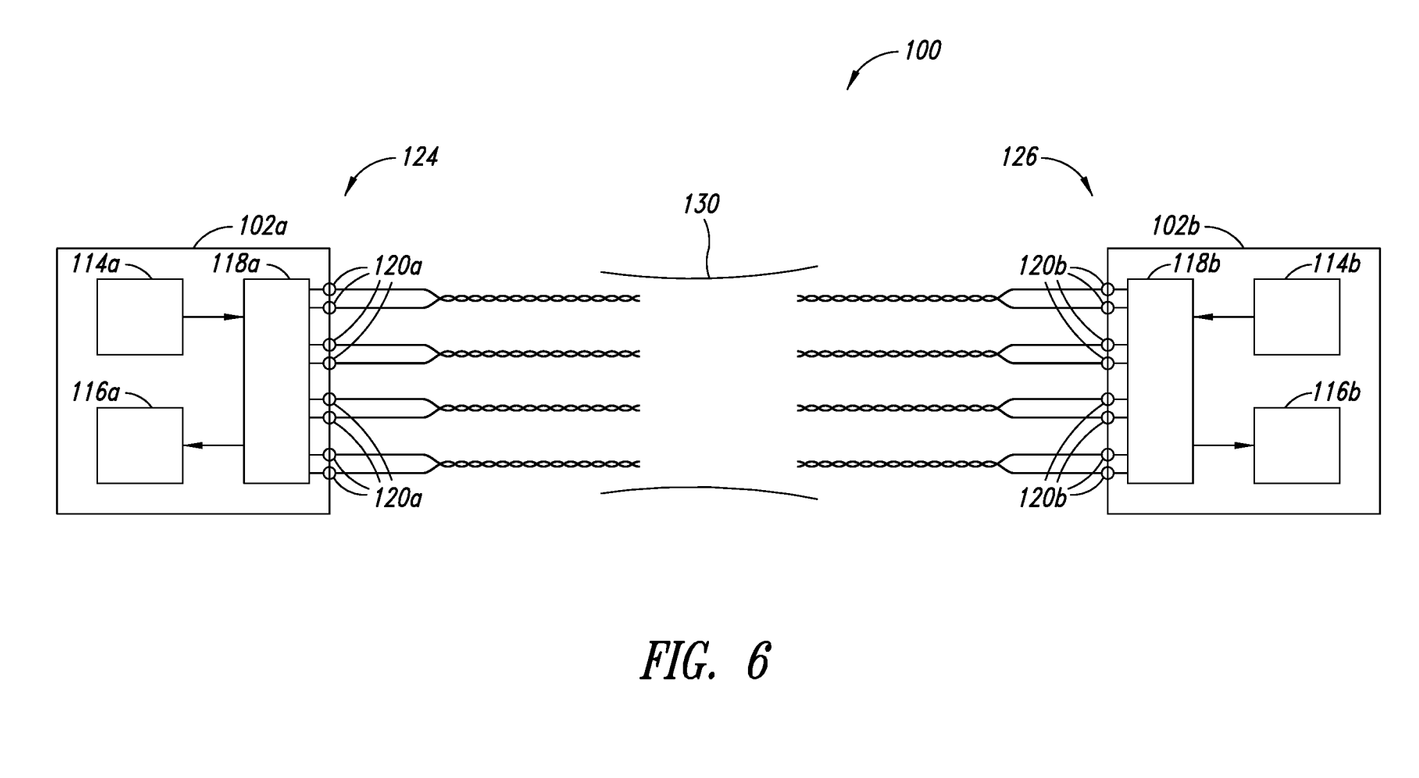
FIG. 6 shows a testing device comprising two testing device terminals.

FIG. 6 shows a testing device 100 comprising two testing device terminals 102a, 102b. A first testing device terminal 102a and a second testing device terminal 102b are each similarly configured as the testing device 100 of FIG. 1. Of the components of the first testing device 102a, a transmitter 114a, a receiver 116a, an attenuator 118a and a plurality of terminals 120a are shown in FIG. 6. Similarly, a transmitter 114b, a receiver 116b, an attenuator 118b and a plurality of terminals of the second testing device terminal 102b are shown in FIG. 6.

The first testing device terminal 102a is coupled to the plurality of first conductors 134a-d and the plurality of second conductors 136a-d of the cable 130 at the first end 124. The second testing device terminal 102b is coupled to the plurality of first conductors 134a-d and the plurality of second conductors 136a-d of the cable 130 at the second end 126.

Use of the dual-terminal testing device 100 allows for testing the SNR headroom at both ends 124, 126 of the cable 130. The first testing device terminal 102a tests the SNR headroom at the second end 126 of the cable 130 and the second testing device terminal 102b tests the SNR headroom at the first second end 124 of the cable 130 as described herein.

Figure 7:
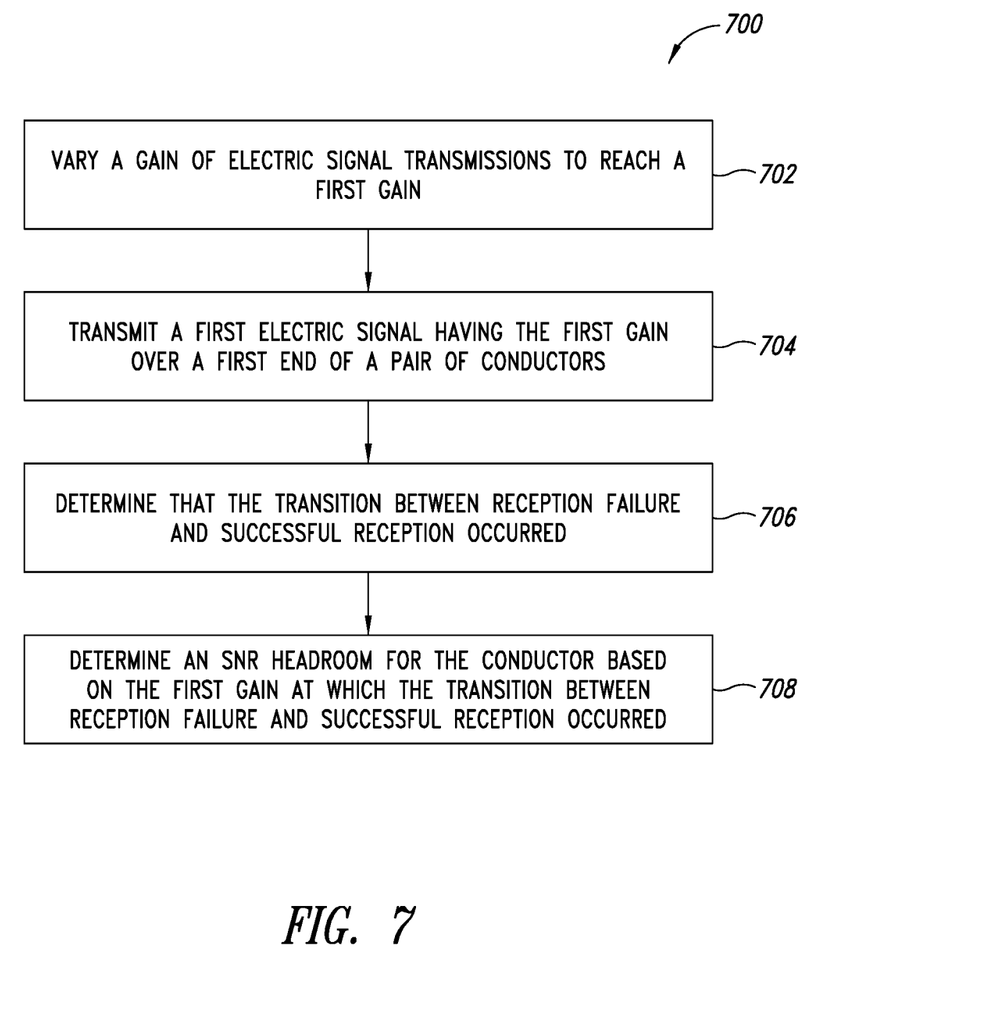
FIG. 7 shows a flow diagram of a method for determining SNR headroom.

FIG. 7 shows a flow diagram of a method 700 for determining SNR headroom. In the method 700, an attenuator, such as the attenuator 118 described with reference to FIG. 1, varies a gain of electric signal transmissions to reach a first gain at 702. Prior to reaching the first gain a transition between reception failure and successful reception of the electric signal transmissions does not occur. At 704, the attenuator transmits a first electric signal having the first gain over a first end of a pair of conductors. At 706, a processor, such as the processor 104 described with reference to FIG. 1, determines that the transition between reception failure and successful reception occurred. The processor, at 708, determines an SNR headroom based on the first gain at which the transition between reception failure and successful reception occurred.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A testing device, comprising:
an attenuator, coupled to a first end of a pair of conductors, configured to receive data indicative of a first gain and adjust a transmission power of a first electric signal, over the pair of conductors, in accordance with the first gain; and
a processor configured to:
vary a gain of electric signal transmissions over the pair of conductors to reach a first gain, wherein prior to reaching the first gain a transition between reception failure and successful reception of the electric signal transmissions does not occur;
output the data indicative of the first gain for transmission of the first electric signal;
determine that the transition between reception failure and successful reception of the first electric signal occurred; and
determine a signal-to-noise ratio (SNR) headroom for the pair of conductors based on the first gain at which the transition between reception failure and successful reception occurred.

2. The testing device according to claim 1, wherein the processor is configured to vary the gain of electric signal transmissions by at least:
decreasing the gain, from a second gain at which reception failure of the first electric signal did not occur, to the first gain or increasing the gain, from a third gain at which successful reception of the first electric signal did not occur, to the first gain.

3. The testing device according to claim 1, wherein the attenuator is a transmitter, coupled to the transmitter, a portion of the transmitter or an amplifier of the transmitter.

4. The testing device according to claim 3, wherein the processor is configured to determine that the transition between reception failure and successful reception of the first electric signal occurred based on a change in a power consumption of the transmitter, a software indication of transmission failure, an increase in a requisite time to transmit a block of data or user input indicating the reception failure or the successful reception.

5. The testing device according to claim 1, further comprising:
a receiver configured to receive, from a second device coupled to a second end of the pair of conductors, data indicative of the reception failure of the first electric signal including at least one of: a non-acknowledgement of reception of the first electric signal, or an indication to reinitiate communication with the second device.

6. The testing device according to claim 1, wherein the processor is configured to determine that the transition between reception failure and successful reception of the first electric signal occurred based on a failure to receive communication from a second device coupled to a second end of the pair of conductors.

7. The testing device according to claim 1, wherein the processor is configured to determine the SNR headroom as:
a difference between a power of the first electric signal without attenuation and the transmission power of the first electric signal at which the transition between reception failure and successful reception occurred, or
a difference between a gain of one and the first gain at which the transition between reception failure and successful reception occurred.

8. The testing device according to claim 1, further comprising:
an output device, communicatively coupled to the processor, configured to receive the SNR headroom from the processor and output the SNR headroom.

9. A method, comprising:
varying a gain of electric signal transmissions over a pair of conductors to reach a first gain, wherein prior to reaching the first gain a transition between reception failure and successful reception of the electric signal transmissions does not occur;
transmitting a first electric signal having the first gain over a first end of the pair of conductors;
determining that the transition between reception failure and successful reception of the first electric signal occurred; and
determining a signal-to-noise ratio (SNR) headroom for the pair of conductors based on the first gain at which the transition between reception failure and successful reception occurred.

10. The method according to claim 9, wherein varying the gain of electric signal transmissions includes:
decreasing the gain, from a second gain at which the transition between reception failure and successful reception of the first electric signal did not occur, to the first gain or increasing the gain, from a third gain at which the transition between reception failure and successful reception of the first electric signal did not occur, to the first gain.

11. The method according to claim 9, wherein determining that the transition between reception failure and successful reception of the first electric signal occurred includes:
receiving data indicative of a reception failure of the first electric signal; and
determining, based on the data, that the transition between reception failure and successful reception of the first electric signal occurred.

12. The method according to claim 11, wherein the data indicative of the reception failure includes a non-acknowledgement of reception of the first electric signal, an indication to reinitiate communication, a change in a power consumption of a transmitter, a software indication of transmission failure, an increase in a requisite time to transmit a block of data or user input indicating the reception failure or the successful reception.

13. The method according to claim 9, wherein determining that the reception failure of the first electric signal occurred includes determining a failure to receive communication from a second device coupled to a second end of the pair of conductors.

14. The method according to claim 9, further comprising:
determining the SNR headroom as:
a difference between a power of the first electric signal without attenuation and a transmission power of the first electric signal at which the transition between reception failure and successful reception occurred, or
a difference between a gain of one and the first gain at which the transition between reception failure and successful reception occurred.

15. A system, comprising:
a first testing device terminal including:
a first attenuator, coupled to a first end of a first pair of conductors, configured to:
receive data indicative of a first gain; and
adjust a transmission power of a first electric signal, over the first pair of conductors, in accordance with the first gain; and
a first processor configured to:
vary a gain of electric signal transmissions over the first pair of conductors to reach the first gain, wherein prior to reaching the first gain a transition between reception failure and successful reception of the electric signal transmissions does not occur;
output, to the first attenuator, the data indicative of the first gain for transmission of the first electric signal;
receive data indicating that the transition between reception failure and successful reception occurred; and
determine a first signal-to-noise ratio (SNR) headroom for the first pair of conductors based on the first gain at which the transition between reception failure and successful reception of the first electric signal occurred; and
a second testing device terminal including:
a second attenuator, coupled to a second end of a second pair of conductors, configured to:
receive data indicative of a second gain; and
adjust a transmission power of a second electric signal, over the second pair of conductors, in accordance with the second gain; and
a second processor configured to:
vary a gain of electric signal transmissions over the second pair of conductors to reach the second gain, wherein prior to reaching the second gain a transition between reception failure and successful reception of the electric signal transmissions does not occur;
output, to the second attenuator, data indicative of the second gain for transmission of the second electric signal;
receive data indicating that the transition between reception failure and successful reception of the second electric signal occurred; and
determine a second SNR headroom for the second pair of conductors based on the second gain at which the transition between reception failure and successful reception of the second electric signal occurred.

16. The system according to claim 15, wherein the first SNR is determined for the second end of the first pair of conductors and the second SNR headroom is determined for the first end of the second pair of conductors.

17. The system according to claim 15, wherein the first processor is configured to vary the gain of electric signal transmissions by at least:
decreasing the gain, from a third gain at which the transition between reception failure and successful reception of the first electric signal did not occur, to the first gain.

18. The system according to claim 15, wherein:
the second testing device terminal is coupled to a second end of the first pair of conductors;
the first testing device terminal is coupled to a first end of the second pair of conductors;
the first testing device terminal includes a first receiver configured to receive, from the second testing device terminal, the data indicating that the transition between reception failure and successful reception of the first electric signal occurred; and
the second testing device terminal includes a second receiver configured to receive, from the first testing device terminal, the data indicating that the transition between reception failure and successful reception of the second electric signal occurred.

19. The system according to claim 18, wherein the data indicating that the transition between reception failure and successful reception of the first electric signal occurred includes: a non-acknowledgement of reception of the first electric signal, or an indication to reinitiate communication with the second testing device terminal, and the data indicative indicating that the transition between reception failure and successful reception of the second electric signal occurred includes: a non-acknowledgement of reception of the second electric signal, or an indication to reinitiate communication with the first testing device terminal.

20. The system according to claim 15, wherein the first attenuator is a transmitter, is coupled to the transmitter, is a portion of the transmitter or is an amplifier of the transmitter and the data indicating that the transition between reception failure and successful reception includes a change in a power consumption of the transmitter, a software indication of transmission failure, an increase in a requisite time to transmit a block of data or user input indicating the reception failure or the successful reception.

* * * * *

UNITED STATES PATENT AND TRADEMARK OFFICE
CERTIFICATE OF CORRECTION

PATENT NO. : 10,715,205 B1  
APPLICATION NO. : 16/545579  
DATED : July 14, 2020  
INVENTOR(S) : John Paul Hittel et al.

It is certified that error appears in the above-identified patent and that said Letters Patent is hereby corrected as shown below:

On the Title Page

Item (54) and in the Specification Column 1 Line 1:  
"SIGNAL TO-NOISE HEADROOM DETERMINATION BY VARIABLE ATTENUATION"  
Should read:  
--SIGNAL-TO-NOISE HEADROOM DETERMINATION BY VARIABLE ATTENUATION--.

Signed and Sealed this  
Tenth Day of November, 2020

Andrei Iancu  
*Director of the United States Patent and Trademark Office*